(12) United States Patent
Schauder et al.

(10) Patent No.: US 8,105,992 B2
(45) Date of Patent: Jan. 31, 2012

(54) VISCOSITY INDEX MODIFIERS AND LUBRICANT COMPOSITIONS CONTAINING SUCH VISCOSITY INDEX MODIFIERS

(75) Inventors: Jean-Roch Schauder, Wavre (BE); Kirk Alan Nass, San Francisco, CA (US); Periagaram Srinivasan Ravishankar, Kingwood, TX (US); Karine Vincent, Touffreville la Cable (FR)

(73) Assignee: ExxonMobil Chemical Patents Inc., Houston, TX (US)

( * ) Notice: Subject to any disclaimer, the term of this patent is extended or adjusted under 35 U.S.C. 154(b) by 603 days.

(21) Appl. No.: 11/800,649

(22) Filed: May 7, 2007

(65) Prior Publication Data
US 2008/0039350 A1 Feb. 14, 2008

Related U.S. Application Data

(60) Provisional application No. 60/818,148, filed on Jun. 30, 2006.

(51) Int. Cl.
*C10M 119/02* (2006.01)
*C10M 143/00* (2006.01)
*C08F 255/02* (2006.01)

(52) U.S. Cl. .......... 508/591; 526/348; 525/324; 585/10; 585/12

(58) Field of Classification Search .................. 508/591; 526/348; 525/324; 585/10, 12
See application file for complete search history.

(56) References Cited

U.S. PATENT DOCUMENTS

| 4,882,406 A | 11/1989 | Cozewith et al. ............. 526/336 |
| 4,900,461 A | 2/1990 | Ver Strate et al. ........... 252/49.6 |
| 6,110,880 A | 8/2000 | Verstrate et al. .............. 508/591 |
| 2004/0121922 A1* | 6/2004 | Okada et al. .................. 508/591 |
| 2004/0254082 A1* | 12/2004 | Bloch et al. ................... 508/591 |

FOREIGN PATENT DOCUMENTS

| GB | 1 175 670 | 12/1969 |
| WO | WO 91/12285 | 8/1991 |
| WO | WO 95/27745 | 10/1995 |
| WO | WO 95/27746 | 10/1995 |
| WO | WO 98/58978 | 12/1998 |
| WO | WO9858978 | * 12/1998 |
| WO | WO 2004/087849 | 10/2004 |

* cited by examiner

*Primary Examiner* — Michael Marcheschi
*Assistant Examiner* — Chantel Graham

(57) ABSTRACT

The invention relates to viscosity modifier polymers, concentrate and lubricant formulations utilizing a diblock polymer having one block A and one block B, block A contributing from 15 to 30% of the total chain length and block B from 70 to 85% of the total chain length, wherein block A comprises at least 93 wt % of ethylene and at least one other alpha-olefin and block B comprises an ethylene content between 40 and 75 wt % and at least one other alpha-olefin and wherein the resulting block copolymer has an average ethylene content of between about 60 wt % to 80 wt % ethylene, a fast Gaussian NMR relaxation signal between 17 and 22% and a slow exponential NMR relaxation signal between 58 and 68% of the total NMR relaxation signal, a SSI of at least 35% and a TE of at least 3.5 in order to obtain improvements in fuel economy.

6 Claims, No Drawings

VISCOSITY INDEX MODIFIERS AND LUBRICANT COMPOSITIONS CONTAINING SUCH VISCOSITY INDEX MODIFIERS

CROSS REFERENCE TO RELATED APPLICATIONS

This application claims the benefit of Provisional Application No. 60/818,148 filed Jun. 30, 2006, the disclosure of which is incorporated by reference in its entirety.

FIELD OF THE INVENTION

The invention relates to viscosity index modifiers and to lubricant compositions containing such viscosity index modifiers for use principally in engine lubrication.

BACKGROUND OF THE INVENTION

Improving fuel economy is an important factor in developing lubricating oil compositions. In the automotive industry, manufacturers have required that engines oils have a demonstrable fuel economy. This can affect the new specifications for automotive lube oils. Engine oil formulators have employed appropriate additives to modify the composition's lubricity, typically with additives called friction modifiers/enhancers, selected to reduce the coefficient of friction of the lubricating oil composition.

Engine tests such as the Sequence VIB test have been introduced in the US to quantify fuel economy across a range of engine running conditions; Sequence VIB is considered as the reference test to predict fuel economy improvement resulting from lube oil formulations optimization. The Sequence VIB has five operational stages, each stage varies in engine speed, engine load and oil temperature. The response to an engine oil formulation is dependent on the engine operating conditions. At high speeds and low temperatures, a thick intervening oil film develops between moving engine parts. Under these conditions, the friction of the engine and hence fuel economy is highly dependent on the viscous drag of the engine oil. At low speeds and high temperatures, oil film breakdown can occur. In this case, friction is highly dependent on the adsorption of friction reducing additives on the surfaces of rubbing of engine parts. Minimizing overall engine friction thus maximizing Sequence VIB fuel economy requires selecting or tailoring additives to operate across these operational stages. There are also lab-scale tests such as the HTHS (High Temperature High Shear) Viscosity measurements which are described as giving indicators of fuel economy improvement.

U.S. Pat. No. 6,110,880 describes AB block copolymers having an ethylene (>93%) rich A block and a B block having an ethylene content between 40 and 85 wt %, a thickening efficiency of 2.3 and a SSI of less than 25% or a thickening efficiency of 3.5 and a shear stability less than 35%. The A block comprises 15 to 25 wt % of the block copolymer. The polymers are disclosed for use in lubricating oils to change the viscosity characteristics of the composition.

As known in the art, Viscosity Index Improvers "VII" (a term generally interchangeable with Viscosity Index Modifiers) reduce the rate of viscosity change with temperature and impart a non-Newtonian fluid property to the oil composition since the viscosity varies with the shear rate. While lowering the viscosity of engine oil is effective in reducing internal friction it also decreases the oil's film thickness and decreases the hydrodynamic boundary layer formation, which can lead to increased wear.

Generally shear stability is inversely proportional to molecular weight. A Viscosity Index Improver polymer with good shear stability (low SSI value) is typically used at higher initial concentrations relative to another polymer having reduced shear stability (high SSI value) to obtain the same target thickening effect in a treated fluid at high temperatures; the polymer having good shear stability may, however, produce unacceptable thickening at low temperatures due to the higher use concentrations. Conversely, although lubricating oils containing lower concentrations of reduced shear stability VI-improving polymers may initially satisfy the higher temperature viscosity target; fluid viscosity will decrease significantly with use causing a loss of effectiveness of the lubricating oil. Thus, the reduced shear stability of specific VI-improving polymers may be satisfactory at low temperatures (due to its lower concentration) but it may prove unsatisfactory under high temperature conditions. The amount of Viscosity Index Improver polymer necessary to achieve a given thickening effect is quantified and referred to as the thickening efficiency (TE).

The present invention is directed in part to the unexpected discovery that by carefully crafting the Viscosity Index Improving polymer's A and B blocks in relationship with the SSI, TE and NMR signal, the resulting polymer structure could be optimized for fuel economy improvement. It is among the objects of the invention to provide a Viscosity Index Improver polymer composition having molecular weight, thickening efficiency, shear stability and HTHS viscosity (High Temperature High Shear) viscosity with improved performance across a broader temperature range.

SUMMARY OF THE INVENTION

The invention describes a viscosity modifier polymer comprising a diblock polymer having one block A and one block B, block A contributing from 15 to 30% of the total chain length and block B from 70 to 85% of the total chain length, wherein block A comprises at least 93 wt % of ethylene and at least one other alpha-olefin and block B comprises an ethylene content between 40 and 75 wt % and at least one other alpha-olefin and wherein the resulting block copolymer has an average ethylene content of between about 60 wt % to 80 wt % ethylene, a fast Gaussian NMR relaxation signal between 17 and 22% and a slow exponential NMR relaxation signal between 58 and 68% of the total NMR relaxation signal, a SSI of at least 35% and a TE of at least 3.5. The viscosity modifier polymer can be added to at least one synthetic or natural oil base stock to form a concentrate and can be employed in a lubricating oil composition.

The diblock polymer may be part of a polymer composition comprising also polymers other than diblock polymers that are formed as by-products of the diblock producing process. Preferably the diblock comprises at least 75 wt %, 80 wt % or 90 wt % of the total polymer content.

The present invention provides a polymer with a block AB structure, block A having a composition being almost a polyethylene composition and block B having an ethylene alpha-olefin composition. The particular block AB structure polymer gives a lower High Temperature High Shear between 50° C. and 150° C. in comparison to narrow Molecular Weight Distribution Polymers such as those described in (U.S. Pat. No. 4,900,461) not having an AB block structure. The present invention carefully selects the A and B blocks in relationship with the SSI, TE, and NMR signal of polymers optimized for fuel economy.

Both the TE and SSI are related to molecular weight; polymers having low molecular weight generally have both lower measured TE and lower SSI than polymers having a high molecular weight. However, the TE and SSI are also determined by the polymer structure and chemistry. The block copolymers have generally a higher TE than polymers having the same SSI but a random distribution of monomers.

The present invention provides a polymer with a block AB structure, having a high degree of polyethylene composition in a relatively short A block and a second B block of a copolymer of ethylene and another alpha-olefin. The high crystallinity and lower solubility of the high ethylene content A block in base oil compared to the B block provides a mechanism by which the A blocks of adjacent polymer molecules will associate to form large structures consisting of several polymer molecules. The associations are reversible and easily broken by shearing and by increasing temperature.

The characteristic of forming large reversibly associated structures imparts several specific characteristics to the polymer of the present invention. TE is measured at low shear rate, so the polymer appears to have a high apparent molecular weight and therefore is observed to have a high TE; under the high shear conditions used to measure the SSI the associations are broken and the measured SSI depends only on the size and characteristics of the individual molecules. The polymer therefore is observed to have an exceptionally high TE, and therefore lower treat rate, at all SSI compared to other polymers having the same ethylene content but without the AB block structure of the present invention.

The invention also includes lubricant compositions prepared from at least one synthetic or natural oil base stock and the above defined AB block viscosity modifier. This lubricant composition will have a HTHS viscosity at 50° C. below 20 cP and a HTHS viscosity at 75° C. below 10 cP and a Fuel Economy Index of at least 2.0 versus a narrow molecular weight distribution reference polymer which is lacking the AB block structure. The lubricant composition is particularly useful in applications such as crankcase oils, hydraulic fluids, turbine oils, gear oils, functional fluids, industrial oils and catapult oils.

The HTHS viscosity is indicative of the potential for engine wear; low values are believed to correspond to thin film thicknesses on metal engine parts and high wear. Minimum HTHS values at 150° C. have been established in the SAE J300 specifications classifying engine oil grades. Within an oil grade, low HTHS viscosity is also believed to contribute to increased engine wear but, may promote fuel economy, as low viscosity leads to decreased resistance between moving engine parts and therefore lower fuel consumption.

The invention also covers the process for manufacturing the lubricant composition comprising the AB block viscosity modifier.

Using the AB block viscosity modifier of the present invention in a formulated oil, the viscosity of the oil at temperatures between 50° C. and 90° C. may be reduced due to the association of the A and B segments of the polymer. It is believed fuel may be saved as a result of reduced friction possibly at the entrance to bearings or other squeezing flows, where much viscous dissipation occurs because the oil starts out at a low temperature after cooling off in circulation or in the sump. On this basis, polymers that undergo coil collapse at 80° C. and at lower temperature have the potential of improving fuel economy. The HTHS (High Temperature High Shear) viscosity may then be useful as an analogue test predictive of fuel economy. Thus, an aspect of the present invention is directed to a method of improving fuel economy of an internal combustion engine comprising operating the engine with a lubricating oil composition comprising at least one synthetic or natural oil base stock and an AB block viscosity modifier polymer comprising one block A and one block B, block A contributing from 15 to 30% of the total chain length and block B from 70 to 85% of the total chain length, wherein block A comprises at least 93 wt % of ethylene and at least one other alpha-olefin and block B comprises an ethylene content between 40 and 75 wt % and at least one other alpha-olefin and wherein the resulting block copolymer has an average ethylene content of between about 60 wt % to 80 wt % ethylene, a fast Gaussian NMR relaxation signal between 17 and 22% and a slow exponential NMR relaxation signal between 58 and 68% of the total NMR relaxation signal, a SSI of at least 35% and a TE of at least 3.5. In a preferred aspect of the lubricating oil composition above, the AB block viscosity modifier polymer comprises from 0.01 to 2.00 wt % of the total lubricating oil composition.

In the polymer inter- and intra-chain associations are believed to be broken at the shear rate encountered in the HTHS test at temperatures above 70° C. The breaking up of the associations in the polymer of the present invention may be adjusted by changing the relative sizes and compositions of the A and B blocks. The high ethylene content of the A block helps association and its composition controls the temperature at which these associations take place. It is desirable that the length of the A block is large enough to provide sufficient association of the molecules but not so large as to suppress the solubilization effect brought by the more amorphous ethylene propylene B block component.

The B block has a lower ethylene content than the A block to ensure that molecular association occurs primarily via the A blocks as well as solubility in the base stock. For polymers having overall ethylene contents between about 60 to 80 wt % ethylene, distinctions in the HTHS viscosity around 70° C. occur predominately when the A block contains at least 93 wt % ethylene and makes up between 15 to 30% of the total weight of the polymer molecule and the B block has between 40 and 75 wt % ethylene. These particular variations in the AB block structure which lead to the reversible associations identified by HTHS test have also shown structural distinctions when characterized by the NMR relaxation signal. The preferred polymers of the present invention, therefore, have excellent TE at all values of SSI, good fuel economy, and particular NMR relaxation signals.

The block copolymer can be produced by a polymerization process using a reaction mixture comprising a catalyst, ethylene and at least one additional alpha-olefin comonomer in presence of an inert solvent. The copolymerization is performed in a continuous process comprising a plug-flow, preferably a substantially mix-free reactor system, which is one in which substantially no mixing occurs between portions of the reaction mixture that contain polymer chains initiated at different times. In such reactor systems, mechanical back-mixing is avoided and the reagents and reactant products may be present in concentration that differ substantially in the direction of plug flow but limited by thermal diffusion or mixing at the reactor walls. Tubular reactors are preferred to carry out such a polymerization and are described in U.S. Pat. No. 4,959,436 and U.S. Pat. No. 4,882,406, both of which are incorporated herein by reference for US purposes.

Typical solvents used for this process are described in U.S. Pat. No. 4,882,406. These include hydrocarbons which are aliphatic, cyclo-aliphatic or aromatic or halogenated versions of such hydrocarbons. These hydrocarbons can have a linear or a branched saturated chain; hexane would be a preferred solvent.

The temperature is preferably controlled to minimize side reactions which may cause catalyst deactivation and chain transfer which may lead to by-product that are not diblocks.

An excess of side reactions may lead to the formation of significant amounts of polymer structures which do not have the desired block structure and which do not contribute effectively to the performance of the viscosity index modifier.

The catalyst system used in carrying out the process in accordance with the present invention may be a Ziegler-Natta catalyst. The catalyst system may be: a) a catalyst in the form of a compound of a transition metal, i.e. a metal Group I-B, III-B, IV-B, V-B, VI-B, VII-B and VIII of the Periodic Table, used in combination with b) an activator or co-catalyst in the form of an organometallic compound of a metal of Groups I-A, II-A, II_B and III-A of the Periodic Table. Preferred catalyst systems are described in U.S. Pat. No. 4,959,436 and U.S. Pat. No. 4,882,406. Preferred catalyst systems may comprise hydrocarbon soluble vanadium compounds in which the vanadium valence is 3 to 5 and organo-aluminum compounds with the proviso that the catalyst yields essentially one active catalyst species as described above. At least one of the vanadium compound/organo-aluminum pair selected must also contain a valence-bonded halogen.

Vanadium compounds useful in the practicing processes in accordance with the present invention include: $VOCl_x(OR)_{3-x}$ (1), $VCl_x(COOR)_{3-x}$ (2) where x=0 to 3 and R=a hydrocarbon radical; $VCl_4$ (3), $V(AcAc)_2$, $V(AcAc)_3$ where AcAc=acetyl acetone; and where x=1 or 2; and $VCl_3 \cdot nB$, wherein n=2 to 3 and B=a Lewis base capable of making hydrocarbon soluble complexes with $VCl_3$ such as tetrahydrofuran, 2-methyl-tetrahydrofuran and dimethyl pyridine. In Formulas (1) and (2) above, R preferably represents $C_1$ to $C_{10}$ aliphatic, alicyclic, or aromatic hydrocarbon radical such as ethyl (Et), phenyl, isopropyl, butyl, propyl, n-butyl, i-butyl, t-butyl, hexyl, cyclohexyl, octyl, naphthyl, etc. Non-limiting illustrative examples of formulas (1) and (2) compounds are vanadyl trihalides, alkoxy halides and alkoxides such as $VOCl_3$, $VOCl_2$ (OBu) where Bu=butyl, $VO(OC_2H_5)_3$, and vanadium dichloro hexanoate. The most preferred vanadium compounds are $VCl_4$, $VOCl_3$ and $VOCl_2(OR)$.

As already noted, the co-catalyst is preferably an organoaluminum compound. In terms of chemical formulas, these compounds could be $AlR_3$, $AlR_2X$, $AlR'RX$, $Al_2R_3X_3$, $AlRX_2, Al(OR')R_2, R_2Al$—O—$AlR_2$ and methyl alumoxane, wherein R and R' represent hydrocarbon radicals, R and R' being the same or different, and wherein X is a halogen selected from the group consisting of bromine, chlorine, and iodine, with chlorine being preferred. The most preferred organoaluminum compound for use with a vanadium compound is an aluminum alkyl sesquichloride such as $Al_2Et_3Cl_3$ or $Al_2(iBu)_3Cl_3$. The catalyst and its effects on the polymerization are disclosed in U.S. Pat. No. 4,882,406.

Chain transfer reactions during tubular reactor polymerization can broaden molecular weight distribution and cause the formation of undesirable species such as A-only polymer or B-only polymer rather than the desired AB block copolymers of the present invention. Lower temperatures and the absence of hydrogen reduce the extent of hydrogen, monomer, or aluminum alkyl transfer reactions and the proportion of the polymeric products in the final reaction product. U.S. Pat. No. 4,882,406 discloses chain transfer reactions. Molecular weight distribution and percent of block copolymer in the final product are also affected by catalyst deactivation during the course of polymerization, which leads to termination of growing chains. Early chain termination will reduce the yield of the desired block copolymers. Using the shortest residence time and the lowest temperature in the reactor that will produce the desired monomer conversions can reduce deactivation.

Typically, A block, which is polyethylene rich, will be polymerized in the first section of the tubular reactor followed by the EP block in the subsequent sections. In order to achieve the polymerization in the reverse order, i.e. polymerize the EP block first, can only be done under conditions where the catalyst would completely convert propylene in the first section before producing the polyethylene rich segment. Such polymerization can only be conducted at extremely low temperatures such as −60° C. as described by Doi in Advances in Polymer Sciences, 73, 201 (1996).

The sequential addition process using metallocene catalysts as described in U.S. Pat. No. 5,391,629, the subject matter of which is incorporated herein by reference, can also produce these polymers.

In the first step of the sequential addition process, the catalyst is placed in a well-stirred batch reactor in a suitable solvent and adding a specific number of molar equivalents of monomer(s) to grow the first segment of the block copolymer. The catalyst consumes all of the monomer(s) prior to addition of the second monomer(s) (a different set of monomers than in the first step). This procedure can be repeated to prepare multiblock copolymers. As an added step the polymerization vessel can be vacuumed free of substantially all leftover monomer or vented of monomer and/or purged with nitrogen or other suitable inert dry gases in-between some or all of the monomer addition steps.

The process of this invention is practiced with that class of catalyst referred to, disclosed, and described in U.S. Pat. Nos. 5,055,438; 5,057,475; 5,096,867; 5,017,714; 5,153,157; co-pending U.S. Ser. No. 542,236 filed Jun. 22, 1990; Ser. No. 468,382 filed May 21, 1991; Ser. No. 885,170 filed May 18, 1992; Ser. No. 737,611 filed Jul. 19, 1991; Ser. No. 926,006 filed Aug. 5, 1992; Ser. Nos. 07/133,052 and 07/133,480 and EPA's 277,003, 277,004, published Jun. 3, 1988; EPA 129, 368 published Dec. 22, 1984, EPA 520,732 published Dec. 30, 1992 all of which are incorporated by reference herein. The activated catalyst is prepared by combining at least two components. The first of these is a single site catalyst including a pyridine amine type catalyst, a mono or bis(cyclopentadienyl) derivative of a Group IV-B metal compound containing at least one ligand which will combine with the second activator component or at least a portion thereof such as a cation portion thereof. The second component may be an alumoxane or a non-coordinating anion.

In general, most Group IV-B metal components may be combined with most activator components to produce an active olefin polymerization catalyst. To obtain block copolymer with a hard segment and a soft segment, it is important to choose a catalyst capable of producing both. For example, a chiral activated catalyst will produce stereoregular polyolefins while an achiral activated catalyst typically produces non-stereoregular, even amorphous, polyolefins. As an example, a chiral cyclopentadienyl hafnium based catalyst could be used to produce hard blocks of isotactic polypropylene and at different reaction conditions the same catalyst could then produce soft "elastomer" blocks of EP. Anionic coordination complexes containing perfluorophenyl-, trifluoromethylphenyl-, or bis-trifluoromethylphenyl rings are preferred. When the non-coordinating anion contains a plurality of boron atoms, more effective catalysts are obtained with activator compounds containing larger anions.

Preferred catalyst systems for the production of block copolymers include single-sited living catalysts. Living catalysts are those systems in which chain transfer is substantially nonexistent and the rate of initiation is fast compared to propagation. Catalysts which have finite chain transfer rates may also be useful for the production of block and tapered copolymers if the rate of propagation is fast relative to termination. It is also important that the average chain lifetimes are reasonably long (minutes to hours) in order to permit adequate time for modifications of the reactor conditions (e.g. changing monomer feed streams). While most reasonably stable ionic catalysts described above will under suitable conditions produce block and/or tapered copolymers of non polar olefins, it is preferred that the catalyst be: 1) thermally stable (recoverable as a single organometallic complex), 2) versatile in terms of random copolymer synthesis (i.e. capable of preparing HDPE, i-PP, s-PP, EP-rubber, LLDPE etc.), 3) capable of producing high molecular weight polymers at reasonable temperatures and pressures, 4) high activity (fast propagation catalysts) and 5) slow in chain termination reactions so that few chains of polymer product are produced per hour per site.

Preferred activated biscyclopentadienyl catalysts are represented by the formulae:

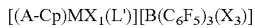

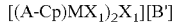

wherein: M is titanium, zirconium or hafnium; (A-Cp) is either (Cp)(Cp*) or Cp-A'Cp*; and Cp and Cp* are the same or different substituted or unsubstituted cyclopentadienyl radicals; A' is a covalent bridging group containing a Group IV-A element; L' is a neutral Lewis base; $X_1$ is a hydride radical, hydrocarbyl radical having from 1 to about 20 carbon atoms, substituted-hydrocarbyl radical, wherein 1 or more of the hydrogen atoms are replaced with a halogen atom, having from 1 to about 20 carbon atoms, or organo-metalloid radical comprising a Group IV-A element wherein each of the hydrocarbyl substituents contained in the organo portion of said organo-metalloid, independently, contain from 1 to about 20 carbon atoms; $X_3$ is a hydride, halide, hydrocarbyl radical, a $C_1$-$C_{20}$ hydrocarbyl radical wherein one or more of the hydrogen atoms is replaced by a halogen atoms, organometalloid radical wherein each hydrocarbyl substitution in the organo portion contains from 1 to 20 carbon atoms and the metal is a Group IVA metal and B' is a non-coordinating anion. In another preferred embodiment B' can be replaced with an alumoxane, preferably methylalumoxane. These catalysts are preferred catalysts for the production of block and tapered copolymers of ethylene, 1-olefins, dienes, cyclic olefins and other unsaturated monomers. Ionic catalysts of this form where M=Hf are the most preferred. Polymerizations using hafnium systems of this form under standard random copolymer conditions as described in our co-pending U.S. patent application Ser. No. 133,480 produce high molecular weight HDPE, LLDPE, a-PP, i-PP, s-PP, and EP-rubber at rates comparable to similar Zr-based catalysts. In another embodiment on of the Cp rings could be replaced by a heteroatom ligand as described in U.S. Pat. No. 5,055,438, incorporated by reference above. Tapered and block copolymers containing the above segments can be produced using the appropriate hafnium ionic catalysts using the techniques and process conditions set forth in the following sections.

Other metallocene catalyst systems as those described in US2003/0073785 A1, incorporated by reference, can also be used for the production of the block copolymer of the invention.

Many procedures for modifying the reactor conditions and monomer feeds for the production of block copolymers have been developed and applied using conventional Ziegler-Natta catalysts. The processes include batch reactors and sequential addition techniques, series batch reactors, loop and tubular reactors, and fluidized bed reactors. A review of the processes and patents is given in chapter 4 of "Block Copolymers" [D. C. Allport and W. H. James; John Wiley and Sons, New York 1973]. In principle, the catalysts of this invention can be used in any of the processes described above for the production of well-defined block copolymers.

Anionic polymerization of dienes followed by hydrogenation is another route to get access to the AB block copolymers of the invention. In this case, 1,4-butadiene would be polymerized to give 1,4-polybutadiene, when all butadiene has been consumed, isoprene would be added to react in 1-4 to give 1,4-polyisoprene. The A-B block polydiene copolymer would than be hydrogenated to give an AB block copolymer having a polyethylene A block and a ethylene propylene B block. The production of such polymers is described in U.S. Pat. No. 3,965,019 or in WO 92/16568.

Unlike free-radical polymerization reactions, anionic polymerizations can be performed where there is no facile chemical termination step. Of course, termination reactions do occur, but under carefully selected conditions with the monomers of the present invention, using inert solvents and highly pure reactants, the end groups have indefinite lifetimes.

The non-terminated chains derived from anionic homopolymerization can be used for the synthesis of block polymers by sequential addition of different monomers as described hereinbefore. Thus anionic polymerization offers flexibility in allowing either block or tapered polymers to be readily produced. As mentioned hereinbefore polymers with narrow molecular weight distribution having better shear stability than those with broader distributions can be produced.

Shear stability is a desirable property in polymers used as Viscosity Index Improvers. Anionic polymerization generally offers wider latitude of techniques for producing varied structures of conjugated diolefin polymers. With butadiene monomer, 1,4- and 1,2-addition can be regulated by the appropriate combination of reaction conditions, including catalyst, solvent type, and temperature. Hydrogenated precursor copolymers containing butadiene units predominantly in the 1,4-configuration are much more effective in increasing the Viscosity Index (V.I.) than hydrogenated precursor copolymers containing butadiene units predominantly in the 1,2-configuration.

The polymers of the present invention can be prepared with known metallic and organometallic catalysts such as lithium metal or sodium metal and organo-lithium or organosodium catalysts. Preferred lithium compounds are compounds containing two lithium atoms per compound molecule and include LiRLLi wherein RL is an organic compound, preferably a hydrocarbon having at least one carbon atom and preferably from 3 to 6 carbon atoms. Useful dilithium (DiLi) compounds are disclosed in A. F. Halasa et-al. Organolithium Catalysis of Olefin and Diene Polymerization, Advances in Organometallic Chemistry, Vol. 18, pages 55-97, Academic Press, Inc. (1980). Suitable organo-lithium catalysts may be represented by the formula $R_2Li$ wherein $R_2$ is a $C_3$ to $C_{30}$, and preferably $C_3$ to $C_{10}$ alkyl, aralkyl, or cycloalkyl group. Specific examples of suitable catalysts include n-propyllithium, isopropyllithium, n-butyllithium, tertiarybutyllithium, n-decyllithium, benzyllithium, 4-phenyl-n-butyllithium, etc. Particularly preferred are the butyllithiums, i.e., normal-, sec-, iso-, and tertiarybutyllithiums.

An inert diluent, in which the catalyst is soluble, may be employed. By "inert" it is meant that the diluent does not react, although the nature of the solvent may affect the relative amount of 1,2- and 1,4-configuration that is obtained. The inert diluent will generally be a hydrocarbon free of olefinic unsaturation containing from 3 to 16 carbon atoms. Suitable inert diluents include aliphatics, such as n-pentane, n-hexane, isooctane, n-nonane, etc.; alicyclics, such as cyclopentane, cyclohexane, cycloheptane, etc., aromatics such as benzene, toluene, xylene, chlorobenzene, etc. The amount of diluent employed in the preparation is not critical, except that sufficient amounts should be used to solubilize the amount of organolithium catalyst used. Generally, 0.5 to 200, preferably 1 to 50 liters of the diluent per gram mole of organo-lithium catalyst are employed during the preparation of the polymer.

The amount of catalyst employed primarily depends upon the degree of polymerization desired. The term "degree of polymerization," as employed herein, means the total number of monomeric units present in the polymer. Ordinarily, each mole of organo-lithium catalyst will generate a mole of polymer. Thus, "degree of polymerization" may be conveniently defined by the degree of polymerization=total moles of monomer moles of organo-lithium catalyst since to obtain the desired molecular weights, the average number of monomeric units in the polymer will generally be from about 500 to about 10,000. About 0.0001 to 0.002 mole of organo-lithium catalyst per mole of monomer will ordinarily be utilized.

The polymerization reaction generally takes place at about −50° C. to about 150° C., and preferably at 20° C.' to 60° C. Reaction times as short as 1 minute or as long as 75 hours may be employed. Preferably, the polymerization reaction is carried out for from 4 minutes to 24 hours. Reaction pressure is not critical; pressures may range from atmospheric to super-atmospheric. Preferably for economy and ease of handling, atmospheric pressure is utilized.

In one embodiment the monomers are added sequentially whereby block or segment copolymers may be obtained. For example in the preparation of a copolymer of having a di-block structure T-M, one of the monomers, e.g., butadiene, is polymerized in the presence of the catalyst via 1,4-addition for a period of time, e.g., 2 hours, to form a unsaturated precursor copolymer segment MI containing at least about 65 weight percent butadiene in the 1,4configuration.

Then the conditions of polymerization are changed for polymerization to take place through 1,2-addition. The comonomer forms 1,2-butadiene units resulting in unsaturated precursor segment T'. The segmented copolymer is then hydrogenated to form methylene rich segment M, corresponding to a 1,4polybutadiene content of at least about 20 weight percent, and substituted methylene rich segment T having a methylene content corresponding to 1,4polybutadiene of less than about 20 mole percent.

A hydrogenated copolymer having tri-block structure TI-M2-T3, can be prepared by first polymerizing butadiene by 1,2-addition, to form unsaturated precursor segment T11 containing predominantly 1,2-butadiene units; the reaction conditions are changed and the butadiene monomer is polymerized (in the presence of T11) via 1,4-addition mechanism to form unsaturated precursor segment M2' containing at least about 20 mole percent of 1,4-configuration butadiene; and then the reaction conditions changed to polymerize the butadiene via 1,2-addition to form unsaturated precursor segment T3 I containing predominantly 1,2-butadiene. The segmented copolymer T1'-M2'-T3' is then hydrogenated to form the T1-M2-T3 structure. In the foregoing discussion concerning the preparation of copolymers of structures M-T and Tj-M2-T3 it is to be understood that the M segment need not contain, and usually does not contain, only methylene units derived from the hydrogenation of 1,4addition butadiene. It may also contain some substituted methylene units derived from the hydrogenation of the 1,2-addition butadiene so long as those substituted methylene units do not exceed about mole percent of the total units. Likewise, segments T, Tj and T3 may contain, and usually do contain, methylene units derived from the hydrogenation of 1,4-addition butadiene, so long as the total methylene units present in T, T, and T3 do not correspond to a 1,4-polybutadiene content exceeding 20 mole percent.

Lubricating Oils

Base oil as used herein is defined as a base stock or blend of base stocks which is a lubricant component that is produced by a single manufacturer to the same specifications (independent of feed source or manufacturer's location); that meets the same manufacturer's specification; and that is identified by a unique formula, product identification number, or both. Base stocks may be manufactured using a variety of different processes including but not limited to distillation, solvent refining, hydrogen processing, oligomerization, esterification, and rerefining. Rerefined stock shall be substantially free from materials introduced through manufacturing, contamination, or previous use. The base oil of this invention may be any natural or synthetic lubricating base oil fraction particularly those having a kinematic viscosity at 100° Centigrade (° C.) and about 4 centistokes (cSt) to about 20 cSt. Hydrocarbon synthetic oils may include, for example, oils prepared from the polymerization of ethylene, polyalphaolefin or PAO, or from hydrocarbon synthesis procedures using carbon monoxide and hydrogen gases such as in a Fisher-Tropsch process. A preferred base oil is one that comprises little, if any, heavy fraction; e.g., little, if any, lube oil fraction of viscosity about 20 cSt or higher at about 100° C. Oils used as the base oil will be selected or blended depending on the desired end use and the additives in the finished oil to give the desired grade of engine oil, e.g. a lubricating oil composition having an SAE Viscosity Grade of 0W, 0W-20, 0W-30, 0W-40, 0W-50, 0W-60, 5W, 5W-20, 5W-30, 5W-40, 5W-50, 5W-60, 10W, 10W-20, 10W-30, 10W-40, 10W-50, 15W, 15W-20, 15W-30, or 15W-40.

The base oil may be derived from natural lubricating oils, synthetic lubricating oils or mixtures thereof. Suitable base oil includes base stocks obtained by isomerization of synthetic wax and slack wax, as well as hydrocrackate base stocks produced by hydrocracking (rather than solvent extracting) the aromatic and polar components of the crude. Suitable base oils include those in all API categories I, II, III, IV and V as defined in API Publication 1509, 14th Edition, Addendum I, December 1998. Saturates levels and viscosity indices for Group I, II and III base oils are listed in Table I. Group IV base oils are polyalphaolefins (PAO). Group V base oils include all other base oils not included in Group I, II, III, or IV. Group III base oils are preferred.

TABLE I

SATURATES, SULFUR AND VISCOSITY INDEX OF GROUP I, II, III, IV AND V BASE STOCKS

| Group | Saturates (As determined by ASTM D2007) Sulfur (As determined by ASTM D2270) | Viscosity Index (As determined by ASTM D4294, ASTM D4297 or ASTM D3120) |
|---|---|---|
| I | Less than 90% saturates and/or Greater than to 0.03% sulfur | Greater than or equal to 80 and less than 120 |

TABLE I-continued

SATURATES, SULFUR AND VISCOSITY INDEX OF GROUP I, II, III, IV AND V BASE STOCKS

| Group | Saturates (As determined by ASTM D2007) Sulfur (As determined by ASTM D2270) | Viscosity Index (As determined by ASTM D4294, ASTM D4297 or ASTM D3120) |
|---|---|---|
| II | Greater than or equal to 90% saturates and less than or equal to 0.03% sulfur | Greater than or equal to 80 and less than 120 |
| III | Greater than or equal to 90% saturates and less than or equal to 0.03% sulfur | Greater than or equal to 120 |
| IV | All Polyalphaolefins (PAOs) | |
| V | All others not included in Groups I, II, III, or IV | |

Natural lubricating oils may include animal oils, vegetable oils (e.g., rapeseed oils, castor oils and lard oil), petroleum oils, mineral oils, and oils derived from coal or shale may also be used.

Synthetic oils may include hydrocarbon oils and halo-substituted hydrocarbon oils such as polymerized and interpolymerized olefins, alkylbenzenes, polyphenyls, alkylated diphenyl ethers, alkylated diphenyl sulfides, as well as their derivatives, analogues and homologues thereof, and the like. Synthetic lubricating oils also include alkylene oxide polymers, interpolymers, copolymers and derivatives thereof wherein the terminal hydroxyl groups have been modified by esterification, etherification, etc. Another suitable class of synthetic lubricating oils comprises the esters of dicarboxylic acids with a variety of alcohols. Esters useful as synthetic oils also include those made from about $C_5$ to about $C_{12}$ monocarboxylic acids and polyols and polyol ethers. Tri-alkyl phosphate ester oils such as those exemplified by tri-n-butyl phosphate and tri-iso-butyl phosphate are also suitable for use as base oils.

Silicon-based oils (such as the polyalkyl-, polyaryl-, polyalkoxy-, or polyaryloxy-siloxane oils and silicate oils) comprise another useful class of synthetic lubricating oils. Other synthetic lubricating oils include liquid esters of phosphorus-containing acids, polymeric tetrahydrofurans, polyalphaolefins, and the like.

The base oil may be derived from unrefined, refined, rerefined oils, or mixtures thereof. Unrefined oils are obtained directly from a natural source or synthetic source (e.g., coal, shale, or tar sand bitumen) without further purification or treatment. Examples of unrefined oils include a shale oil obtained directly from a retorting operation, a petroleum oil obtained directly from distillation, or an ester oil obtained directly from an esterification process, each of which may then be used without further treatment. Refined oils are similar to the unrefined oils except that refined oils have been treated in one or more purification steps to improve one or more properties. Suitable purification techniques include distillation, hydrocracking, hydrotreating, dewaxing, solvent extraction, acid or base extraction, filtration, and percolation, all of which are known to those skilled in the art. Rerefined oils are obtained by treating used oils in processes similar to those used to obtain the refined oils. These rerefined oils are also known as reclaimed or reprocessed oils and often are additionally processed by techniques for removal of spent additives and oil breakdown products.

Base oil derived from the hydroisomerization of wax may also be used, either alone or in combination with the aforesaid natural and/or synthetic base oil. Such wax isomerate oil is produced by the hydroisomerization of natural or synthetic waxes or mixtures thereof over a hydroisomerization catalyst.

It is preferred to use a major amount of base oil in the lubricating oil composition of the present invention. A major amount of base oil as defined herein comprises 40 wt % or more. Preferred amounts of base oil comprise about 40 wt % to about 97 wt %, preferably greater than about 50 wt % to about 97 wt %, more preferably about 60 wt % to about 97 wt % and most preferably about 80 wt % to about 95 wt % of the lubricating oil composition. (When weight percent is used herein, it is referring to weight percent of the lubricating oil unless otherwise specified.)

Another aspect of the present invention is directed to viscosity modifier polymer concentrates. The concentrates are principally used in the formulation of crankcase lubricating oils, primarily of passenger car and heavy duty diesel engines (fully formulated lubricants), which fully formulated lubricants comprise a major amount of an oil of lubricating viscosity and a viscosity modifier polymer described herein, in an amount effective to meet the requirements of the selected finished grade. The viscosity modifier polymer concentrate comprises at least one synthetic or natural oil base stock and a diblock polymer having one block A and one block B, block A contributing from 15 to 30% of the total chain length and block B from 70 to 85% of the total chain length, wherein block A comprises at least 93 wt % of ethylene and at least one other alpha-olefin and block B comprises an ethylene content between 40 and 75 wt % and at least one other alpha-olefin and wherein the resulting block copolymer has an average ethylene content of between about 60 wt % to 80 wt % ethylene, a fast Gaussian NMR relaxation signal between 17 and 22% and a slow exponential NMR relaxation signal between 58 and 68% of the total NMR relaxation signal, a SSI of at least 35% and a TE of at least 3.5 in an amount from about 2 to about 30 wt %, preferably from about 4 to about 20 wt % and more preferably from about 6 to about 12 wt %, and even more preferably from about 3 to 8 wt % based on the total weight of the concentrate. Fully formulated lubricants may be prepared by admixing the concentrate to an otherwise formulated lubricant composition or by admixing the viscosity modifier polymer to a major amount of at least one synthetic or natural oil base stock with other additive components. Thus in this aspect, these lubricating oil compositions further comprise at least one component selected from the group consisting of (A) an ashless dispersant; (B) an oxidation inhibitor; (C) a rust inhibitor; (D) a demulsifier; (E) an extreme pressure agent; (F) a friction modifier; (G) a multifunctional additive; (H) a viscosity index improver other than a diblock polymer; (I) a pour point depressant; (K) a foam inhibitor; and (L) a wear inhibitor; preferably at least three components, more preferably at least five components.

Other Additive Components

The following additive components are examples of components that can be favorably employed in combination with the viscosity modifier polymer of the present invention with a base stock to form a lubricating oil composition. These examples of additives are provided to illustrate the present invention, but they are not intended to limit it.

(A) Ashless dispersants: alkenyl succinimides, alkenyl succinimides modified with other organic compounds, e.g., ethylene carbonating post-treatment and alkenyl succinimides modified with boric acid, polysuccinimides, alkenyl succinic ester.

(B) Oxidation inhibitors:
  1) Phenol type phenolic oxidation inhibitors: 4,4'-methylenebis(2,6-di-tert-butylphenol), 4,4'-bis(2,6-di-tert-butylphenol), 4,4'-bis(2-methyl-6-tert-butylphenol), 2,2'-(methylenebis(4-methyl-6-tert-butylphenol), 4,4'-butylidenebis(3-methyl-6-tert-butylphenol), 4,4'-isopropylidenebis(2,6-di-tert-butylphenol), 2,2'-methylenebis(4-methyl-6-nonylphenol), 2,2'-isobutylidene-bis(4,6-dimethylphenol), 2,2'-methylenebis(4-methyl-6-cyclohexylphenol), 2,6-di-tert-butyl4-methylphenol, 2,6-di-tert-butyl4-ethylphenol, 2,4-dimethyl-6-tert-butyl-phenol, 2,6-di-tert-α-dimethylamino-p-cresol, 2,6-di-tert-4(N,N'-dimethylaminomethylphenol), 4,4'-thiobis(2-methyl-6-tert-butylphenol), 2,2'-thio-bis(4-methyl-6-tert-butylphenol), bis(3-methyl-4-hydroxy-5-tert-butylbenzyl)-sulfide, and bis(3,5-di-tert-butyl4-hydroxybenzyl).
  2) Diphenylamine type oxidation inhibitor: alkylated diphenylamine, phenyl-α-naphthylamine, and alkylated α-naphthylamine.
  3) Other types: metal dithiocarbamate (e.g., zinc dithiocarbamate), and methylenebis(dibutyidithiocarbamate).

(C) Rust inhibitors (Anti-rust agents):
  1) Nonionic polyoxyethylene surface active agents: polyoxyethylene lauryl ether, polyoxyethylene higher alcohol ether, polyoxyethylene nonylphenyl ether, polyoxyethylene octylphenyl ether, polyoxyethylene octyl stearyl ether, polyoxyethylene oleyl ether, polyoxyethylene sorbitol monostearate, polyoxyethylene sorbitol mono-oleate, and polyethylene glycol monooleate.
  2) Other compounds: stearic acid and other fatty acids, dicarboxilic acids, metal soaps, fatty acid amine salts, metal salts of heavy sulfonic acid, partial carboxylic acid ester of polyhydric alcohol, and phosphoric ester.

(D) Demulsifiers: addition product of alkylphenol and ethyleneoxide, polyoxyethylene alkyl ether, and polyoxyethylene sorbitane ester.

(E) Extreme pressure agents (EP agents): sulfurized oils, diphenyl sulfide, methyl trichlorostearate, chlorinated naphthalene, benzyl iodide, fluoroalkylpolysiloxane, and lead naphthenate.

(F) Friction modifiers: fatty alcohol, fatty acid, amine, borated ester, and other esters.

(G) Multifunctional additives: sulfurized oxymolybdenum dithiocarbamate, sulfurized oxymolybdenum organo phosphorodithioate, oxymolybdenum monoglyceride, oxymolybdenum diethylate amide, amine-molybdenum complex compound, and sulfur-containing molybdenum complex compound.

(H) Viscosity Index improvers: polymethacrylate type polymers, ethylene-propylene copolymers, styrene-isoprene copolymers, hydrogenated styrene-isoprene copolymers, hydrogenated star-branched polyisoprene, polyisobutylene, hydrogenated star-branched styrene-isoprene copolymer, and dispersant type viscosity index improvers.

(I) Pour point depressants: polymethyl methacrylate, alkylmethacrylates, and dialkyl fumarate-vinyl acetate copolymers.

(J) Foam Inhibitors: alkyl methacrylate polymers and dimethyl silicone polymers.

(K) Wear Inhibitors: zinc dialkyldithiophosphate (Zn-DTP, primary alkyl type & secondary alkyl type).

Analytical Techniques Description

The total ethylene content of the polymer of the invention is measured according to ASTM 3900 method B.

The polymers of the invention have been characterized by Differential Scanning Calorimetry (DSC). The heat of fusion of the polymers described herein was measured as follows. About 6 to 10 mg of a film of the polymer pressed at approximately 200° C. to 230° C. is removed with a punch die. The sample is placed in a Differential Scanning Calorimeter (Perkin Elmer Pyris Analysis System) without prior annealing and heated at about 20° C./min to attain a final temperature of about 160° C. It is then cooled down to −50° C. at about 10° C./min cooling rate, maintained at −50° C. for 10 min and heated up again to 160° C. at a rate of 10° C./min. The thermogram generated during the second heating is used for analysis; it displays mainly one peak around 120° C. The melting point (mp), which is the temperature at maximum peak, and the enthalpy of fusion ($\delta H$ of fusion), which is the area under the melting peak, are measured.

The propylene content in the A block is calculated from the following equation:

$$\text{C3 in PE block (\%)} = 45.08 - 0.345 * mp \, (°C.)$$

The enthalpy of fusion of the A block can be calculated from following equation:

$$\delta H \text{ of fusion calculated (J/g)} = -42.4 + 1.59 * mp \, (°C.)$$

From the measured $\delta H$ of fusion by DSC and the calculated $\delta H$ of fusion, the percentage of A block in the block copolymer can be computed according to the equation $$A (\%) = (\delta H \text{ of fusion meas.}/151) \times (\delta H \text{ of fusion calc.}/165) \times 100.$$

The ethylene content of the B block can be calculated according to the equation $$C2 (B), \% = [\text{Total C2} - \% A \text{ block}]/[1-(\% A \text{ block}/100)].$$

The polymers of the invention were analyzed by solid phase pulsed low field (20 MHz) proton Nuclear Magnetic Resonance (NMR). Approximately 0.5 grams of sample were placed in an NMR tube and, after thermal equilibration, analyzed at 70° C. using a Free Induction Decay-pulse sequence with pulse width=pw90, a delay between pulses of 2 seconds and 32 transients. The relaxation peak was deconvoluted into 3 peaks which were approximated as two fast Gaussian peaks with respective time constants of 13 and 26 microseconds and one slow exponential model with a time constant of 130 microseconds.

As used herein, number average (Mn), weight average molecular weight (Mw) and molecular weight distribution (Mw/Mn) are determined according to well known methods, for example by GPC (Gel Permeation Chromatography) on a Waters 150 gel permeation chromatograph equipped with a differential refractive index (DRI) detector and a Chromatix KMX-6 on line light scattering photometer. The system is used at 135° C. with 1,2,4-trichlorobenzene as the mobile phase using Shodex (Showa Denko America, Inc) polystyrene gel columns 802, 803, 804 and 805. This technique is discussed in "Liquid Chromatography of Polymers and Related Materials III", J. Cazes editor, Marcel Dekker. 1981, p. 207, which is incorporated herein by reference. No corrections for column spreading are employed; however, data on generally accepted standards, e.g. National Bureau of Standards Polyethylene 1484 and anionically produced hydrogenated polyisoprenes (an alternating ethylene-propylene copolymers) demonstrate that such corrections on Mw/Mn (=MWD) are less than 0.05 units.

The measurement of low shear and high shear viscosity were made by a sweep of frequencies from 0.31 to 201.06 radians/sec at 150° C. on a dynamic analyzer (Rubber Processing Analyzer RPA 2000 from Alpha Technologies Co). The low shear viscosity is the viscosity at 0.31 rad/sec and the high shear viscosity is the viscosity at 201.36 rad/sec. The shear thinning ratio is calculated by dividing the low shear rate viscosity by the high shear rate viscosity.

Between 1.5 and 2 grams of polymer were pressed as a thick film and extracted in a Soxhlet tube with boiling hexane for 24 hours. The remaining polymer was dried in an oven at 105° C. under vacuum and the extractable level was calculated from the sample weight loss after extraction.

Details of Polymer Characteristics and Performance Measurements

Those skilled in the art will appreciate that the polymer's complex chemical structure determines thickening efficiency, shear stability, and HTHS characteristics. The following structural parameters are selected to define a particular target polymer having the handling and performance characteristics that are important for lubricant applications.

The thickening efficiency (TE) is a measure of the thickening power of Viscosity Index Improver polymers. Polymers having a higher TE are more potent and require a lower treat rate in order to achieve the same viscosity than a polymer having a low TE. The thickening efficiency is defined as:

$$TE = \left(\frac{2}{c\ln(2)}\right)\ln\left(\frac{v_{polymer+oil}}{v_{oil}}\right)$$

where v is the kinematic viscosity measured at 100° C. according to ASTM D445 and c is the concentration of polymer expressed as grams of polymer per 100 grams of polymer-oil solution. The thickening power of polymers is influenced by the type of oil and the presence of other additives. In this work, solutions of 1.0 wt % polymer in ENJ-102, a test oil made from Group I base oils which is available from Chevron Oronite Company, were used to measure the thickening efficiency and shear stability index of the present invention. When measured in this way, the thickening efficiencies of commercial Viscosity Index Improver polymers used for automotive engine oils are generally found to be between 1.0 and 3.4.

The Shear Stability Index (SSI) is an indication of the resistance of polymers to permanent mechanical shear degradation in an engine. The SSI is determined by passing a polymer-oil solution for 30 cycles through a high shear Bosch diesel injector according to the procedures listed in ASTM D6278. The SSI of a polymer is calculated from the viscosity of the oil without polymer and the initial and sheared viscosities of the polymer-oil solution using:

$$SSI = 100 \times \left(\frac{v_{(polymer+oil)FRESH} - v_{(polymer+oil)SHEARED}}{v_{(polymer+oil)FRESH} - v_{(oil)FRESH}}\right)$$

where v is the kinematic viscosity measured at 100° C. according to ASTM D445. In order to meet the viscosity requirements for various grades of oil and other performance criteria imposed by automotive engine manufacturers and industry associations, the measured SSI of commercial Viscosity Index Improver polymers are generally between 24 and 50 SSI.

The high temperature high shear (HTHS) data was measured using a fully formulated 5w30 weight crankcase engine oil formulation; however, different viscosity index modifier polymers were employed to demonstrate their contribution. The HTHS of an oil is determined according to ASTM D5481 using a capillary tube. This evaluates the oil at an elevated temperature and shear rate to better attempt to simulate actual extreme engine operating conditions. This replaces the Minimum Oil Film Thickness (MOFT), MOFT data from operating engines generally has not provided a good correlation with actual wear in service.

Fuel economy has been measured by the American Petroleum Institute's Sequence VIB engine test (ASTM D6837) which measures fuel economy improvement (% FEI) of a formulated engine oil and consists of several stages in which the oil temperature ranges in temperature from 45° C. to 125° C. In more than half of the time during the Seq. VIB test in which the % FEI is measured, the oil temperature is held at 70° C. or lower.

Viscosity Index Improver polymers which show distinct reductions in HTHS at the temperatures encountered in the Sequence VIB test are believed to increase the measured % FEI (Fuel Economy Improvement) of an oil. A good indication of the potential of a Viscosity Index Improver polymer to improve fuel economy is therefore provided by looking at the HTHS behaviors of the polymer at temperatures at about 70° C. or lower. Thus, one aspect of the present invention is directed to a method for improving the fuel economy of a engine oil comprising selecting a plurality of viscosity index improver polymers, screening the polymers at HTHS at temperatures at about 70° C. or lower and optionally at a plurality of temperatures, evaluating the HTHS results, and selecting a polymer candidate. The preset temperatures of 50° C. and 75° C. for the Cannon Series I High Temperature High Shear Capillary Viscometer are therefore convenient for investigating fuel economy. A good way to get an indication of the potential for fuel economy improvement is to compare the HTHS of one polymer against another polymer, for example a commercial polymer or other reference polymer. Since some polymers might be expected to have lower HTHS at different temperatures, a good assessment of the overall fuel economy performance is to measure and calculate the difference between the HTHS of a polymer and the reference polymer at both 50° C. and 75° C. A Fuel Economy Index (FEI) can then be calculated as adding the differences in HTHS measured at the two temperatures:

$$FEI = (HTHS_{reference} - HTHS_{polymer})_{75° C.} + (HTHS_{reference} - HTHS_{polymer})_{50° C.}$$

A high value of FEI calculated in this way, for example greater than 3.0, indicates a polymer which generally has a substantially lower HTHS viscosity at temperatures important to the Seq. VIB fuel economy engine test and therefore better fuel economy. The successful candidate can thereafter be blended to a formulated engine oil thereby improving the % FEI as measured in the Seq. VIB test.

EXAMPLES

The Following Diblock Polymers were Made and Tested.

|  | Example 1 | Example 2 | Example 3 | Example 4 | Ref (V878) |
|---|---|---|---|---|---|
| ML (1 + 4), 150° C. | 28.4 | 33 | 41.4 | 45 | 53 |
| C2 Total, wt % | 68.4 | 61.8 | 62 | 70.3 | 60 |
| A Block Melting Temp., ° C. | 117.8 | 118.2 | 118.25 | 105.4 |  |
| A Block C3 Content, % | 4.4 | 4.3 | 4.2 | 8.7 |  |
| A Block δH of Fusion (meas.), J/g | 32.5 | 33.9 | 40.8 | 16.4 |  |
| A Block δH of Fusion (calc.), J/g | 145 | 145.5 | 146.0 | 125.2 |  |
| A block, % | 19.0 | 19.8 | 23.9 | 8.2 |  |
| B Block C2 content, % | 60.9 | 52.4 | 50.1 | 67.6 |  |
| Fast Gaussian (NMR), % | 17 | 18.1 | 20.8 | 11.5 | 1.9 |
| Slow Exponential (NMR), % | 66 | 66.5 | 65.3 | 73.5 | 74.3 |
| GPC Data |  |  |  |  |  |
| Mn | 70 | 88 | 86 | 96 | 119 |
| Mw (DRI) | 113 | 146 | 159 | 175 | 158 |
| MW (LALLS) | 159 | 160 | 172 | 184 |  |
| Mz (LALLS) | 184 | 196 | 219 | 218 |  |
| Mw/Mn | 1.6 | 1.7 | 1.8 | 1.8 | 1.3 |
| Mz/Mw | 1.6 | 1.3 | 1.4 | 1.2 |  |
| RPA |  |  |  |  |  |
| Low Shear Viscosity, Pa · sec | 43152 | 39885 | 59014 | NA | 19821 |
| High Shear Viscosity, Pa · sec | 3677 | 3466 | 3391 | NA | 3214 |
| Shear thinning ratio | 11.7 | 11.5 | 17.4 | NA | 6.2 |
| Extractables, % | 3 | 10 | 10 | 17 | NA |
| HTHS, cP |  |  |  |  |  |
| @50° C. | 18.7 | 20.1 | 19.8 | 22.1 | 22.0 |
| @75° C. | 9.3 | 9.9 | 9.9 | 11.2 | 11.3 |
| @150° C. | 3.0 | 3.0 | 3.0 | 3.0 | 3.0 |
| FEI | 5.3 | 3.9 | 4.3 | 0 | 0 |
| TE | 3.5 | 3.5 | 3.5 | 3.9 | 3.3 |
| SSI, % | 39.1 | 46.8 | 49.2 | 50.8 | 57 |

Examples 1,2 and 3 show that polymers having the structure according to the claims show significant fuel economy improvement (FEI) in comparison to the reference polymer V878 lacking the AB block structure. Also Example 4 indicates that when the A block is much shorter or when the Fast Gaussian and Slow exponential signal are out of the claimed range, no fuel economy improvement is observed.

We claim:

1. Viscosity modifier polymer comprising a diblock polymer having one block A and one block B, block A contributing from 15 to 30% of the total chain length and block B from 70 to 85% of the total chain length, wherein block A comprises at least 93 wt % of ethylene and at least one other alpha-olefin and block B comprises an ethylene content between 40 and 75 wt % and at least one other alpha-olefin and wherein the resulting block copolymer has an average ethylene content of between about 60 wt % to 80 wt % ethylene and a Mw/Mn value of from about 1.6 to about 1.8, a fast Gaussian NMR relaxation signal between 17 and 22% and a slow exponential NMR relaxation signal between 58 and 68% of the total NMR relaxation signal, a SSI of at least 35% and a TE of at least 3.5.

2. A viscosity modifier polymer concentrate comprising at least one synthetic or natural oil base stock and from 3 to 8% of the viscosity modifier polymer of claim 1.

3. A lubricating oil composition comprising at least one synthetic or natural oil base stock and an AB block viscosity modifier polymer comprising one block A and one block B, block A contributing from 15 to 30% of the total chain length and block B from 70 to 85% of the total chain length, wherein block A comprises at least 93 wt % of ethylene and at least one other alpha-olefin and block B comprises an ethylene content between 40 and 75 wt % and at least one other alpha-olefin and wherein the resulting block copolymer has an average ethylene content of between about 60 wt % to 80 wt % ethylene and a Mw/Mn value of from about 1.6 to about 1.8, a fast Gaussian NMR relaxation signal between 17 and 22% and a slow exponential NMR relaxation signal between 58 and 68% of the total NMR relaxation signal, a SSI of at least 35% and a TE of at least 3.5.

4. The lubricating oil composition according to claim 3, in which the AB block viscosity modifier polymer comprises from 0.01 to 2.00 wt % of the total lubricating oil composition.

5. The lubricating oil composition according to claim 4, in which the composition further comprises at least one component selected from the group consisting of (A) an ashless dispersant; (B) an oxidation inhibitor; (C) a rust inhibitor; (D) a demulsifier; (E) an extreme pressure agent; (F) a friction modifier; (G) a multifunctional additive; (H) a viscosity index improver other than a diblock polymer; (I) a pour point depressant; (K) a foam inhibitor; and (L) a wear inhibitor.

6. A method for improving fuel economy of an internal combustion engine comprising operating said engine with the lubricating oil composition of claim 3.

* * * * *